3,557,131
NICOTINATE DERIVATIVES OF VITAMIN $B_6$
Yoshio Yoshimura, Nishinomiya-shi, Hitoshi Uno, Takatsuki-shi, and Akira Irie, Osaka, Japan, assignors to Dainippon Pharmaceutical Co., Ltd., Osaka, Japan, a corporation of Japan
No Drawing. Filed June 6, 1966, Ser. No. 555,243
Claims priority, application Japan, June 15, 1965, 40/35,589; Dec. 17, 1965, 40/77,906
Int. Cl. C07d 31/36
U.S. Cl. 260—295.5     7 Claims

ABSTRACT OF THE DISCLOSURE

Novel esters of nicotinic acid and vitamin $B_6$ and derivatives thereof, such esters in addition to possessing the activity of nicotinic and vitamin $B_6$ additionally possess antiatherosclerosis, hypocholesterolemic and hypoglycemic activities.

---

The object of this invention is to provide a group of novel compounds represented by the formula

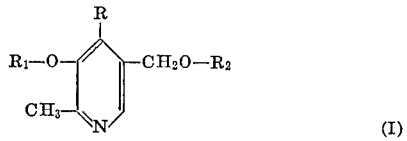

in which vitamin $B_6$ is coupled with nicotinic acid, as well as pharmaceutically acceptable acid addition salts thereof. In the above Formula I, R stands for —$CH_2OH$, —$CH_2NH_2$, —CHO,

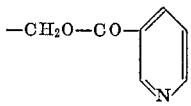

or

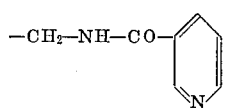

and $R_1$ and $R_2$ each is H or

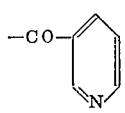

at least one of $R_1$ and $R_2$ being

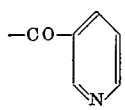

when R is —$CH_2OH$, —$CH_2NH_2$ or —CHO.

One of the characteristics of the compounds of the Formula I and the pharmaceutically acceptable acid addition salts thereof is that in which the prolongation of activities of their components, namely vitamin $B_6$ and nicotinic acid, are established. For example, nicotinic acid, as singly administered, acts drastically and therefore brings on the patient temporary blushing of facial skin as well as of head and limbs as a subsidiary effect. In contrast, with the compounds of the invention the effects showing slowly and being durable, they cause none of such side effect. Again surprisingly it is found that the compounds of the invention have, besides the activities of vitamin $B_6$ and nicotinic acid, remarkable hypocholesterolemic, antiatherosclerelosis and hypoglycemic activities.

The compounds of the Formula I and the acid addition salts thereof can be prepared by the processes which are known per se. One of the processes for the preparation of the compounds of the Formula I comprises condensing vitamin $B_6$ of the formula

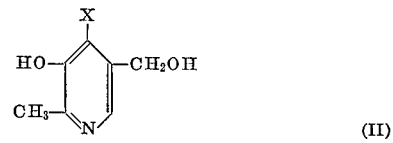

(wherein X stands for —$CH_2OH$, —$CH_2NH_2$ or —CHO) such as pyridoxine, pyridoxamine or pyridoxal with nicotinic acid or its reactive derivative such as acid anhydride or halide. The vitamin $B_6$ reactant may be in the form of an acid addition salt such as, for example, pyridoxine hydrochloride. The nicotinic acid reactant may also be used in the form of an acid addition salt such as hydrochloride of nicotinic acid chloride. This condensation reaction can be performed in the manner known per se. For instance, the condensation reaction of vitamin $B_6$ with free nicotinic acid may be performed in a suitable organic solvent such as pyridine, picoline and the like, and in the presence of a dehydrating and condensing agent such as dicyclohexylcarbodiimide and Vielsmeyer's reagents such as the product from the reaction of thionyl chloride with dimethylformamide, and the product from the reaction of phosgen with dimethylformamide. The condensation reaction of vitamin $B_6$ with nicotinic acid anhydride can be performed in an organic solvent such as chloroform, benzene, toluene and carban tetrachloride, and if desired, in the presence of a catalyst such as pyridine, picoline or triethylamine. Furthermore, when the nicotinic acid reactant is in the form of a nicotinic acid halide or its acid addition salt, the condensation reaction may be performed in the presence of a base such as pyridine, picoline, trimethylamine and triethylamine, and optionally in a suitable organic solvent such as chloroform, benzene, toluene and carbon tetrachloride.

With reference to the Formula II, in case X is $CH_2OH$, the —OH radical in the X may be protected, together with the —OH radical at the 3-position or that in —$CH_2OH$ at the 5-position, by a protective radical known for its protective action of two —OH radicals at the same time. As suitable protective radical, isopropylidene, ethylidene, benzylidene, p-methoxybenzylidene and borate may be named. For instance, 3,4-O-isopropylidene-5-O-nicotinyl-pyridoxine is obtained by nicotinylation of 3,4-O-isopropylidene-pyridoxine (cf. Journal of Organic Chemistry 27, 3724/1962) as in the above. The same product can be converted to 5-O-nicotinyl pyridoxine by splitting off the protective radical therefrom by an accepted practice (e.g. by a treatment with an acid such as hydrochloric, formic or acetic acid).

In the condensation reaction of vitamin $B_6$ with nicotinic acid or its reactive derivative, per 1 mol of vitamin $B_6$ reactant, 2 mols, 3 mols or more of nicotinic acid reactant may be used. Whereas, it is likewise possible to use less amounts of nicotinic acid reactant per 1 mol of vitamin $B_6$ reactant. In case such products in which as part of —$CH_2OH$ or —$CH_2NH$ of vitamin $B_6$ is coupled with nicotinyl radical, for example mononicotinate, are desired, preferably an alternative process as below may be employed or, as for pyridoxine, the aforesaid modification in which the starting material if which adjacent —OH radicals are protected is used and the protective radical is split off after the condensation reaction, may be employed.

Another process for preparation of the compounds of the Formula I comprises condensing a compound of the formula

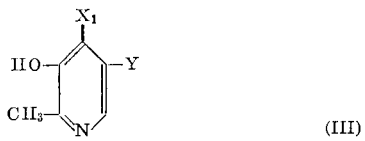

(III)

(wherein $X_1$ stands for —$CH_2OH$, —$CH_2NH_2$, —CHO or —$CH_2$—Hal and Y stands for —$CH_2OH$ or —$CH_2$—Hal, at least one of $X_1$ and Y being —$CH_2$—Hal and Hal meanings halogen)

with a metal nicotinate. For example, reaction of 5-chloromethyl-3-hydroxy-4-hydroxymethyl-2-methyl-pyridine (cf. Ann. 657 162/1962), 4-chloromethyl-3-hydroxy-5-hydroxymethyl-2-methyl-pyridine which is obtained through hydrolysis of 5-benzoyloxymethyl-4-chloromethyl-3-hydroxy-2-methyl-pyridine (cf. Journal of Medical Chemistry 8, 116—7/1965), of 4-aminoethyl-5-bromoethyl-3-hydroxy-2-methyl-pyridine (cf. Monatschafte für Chemie, 89, 685—9, 1958), with metal nicotinate produces the corresponding mono-nicotinates. These reactions are preferably performed in organic solvents such as dimethylformamide, xylene and toluene, at an elevated temperature such as 80°–100° C. Suitable nicotinates include alkali metal nicotinates such as sodium or potassium nicotinate, as well as silver nicotinate.

It is also possible to use in this condensation reaction, in place of metal nicotinate, nicotinic acid and alkali hydroxide such as sodium or potassium hydroxide.

As the typical of the compounds of the Formula 1 3,5-O-dinicotinyl-pyridoxal, 3,5-O-4-N-trinicotinyl-pyridoxamine, 5-O-nicotinyl-pyridoxamine, 3,4,5-O-trinicotinyl-pyridoxine, 4-O-nicotinyl-pyridoxine, 3-O-nicotinyl-pyridoxine and 5-O-nicotinyl-pyridoxine may be named.

Among the above-named, the last is the most preferred.

The typical pharmaceutical activities of 5-O-nicotinyl-pyridoxine are described hereinbelow for illustration.

(1) HYPOCHOLESTEROLEMIC ACTIVITY

Hypocholesterolemic effects in dogs

5-O-nicotinyl-pyridoxine was orally administered to healthy dogs and its effects on their blood cholesterol level were examined. The results together with those of administering, as controls, pyridoxine, nicotinic acid, and pyridoxine plus nicotinic acid, are shown in Table I below. As can be seen from the same table, 5-O-nicotinyl-pyridoxine exhibited remarkable hypocholesterolemic effects when used in the same dosage which proved to be ineffective with either pyridoxine or nicotinic acid. The peak of the effect appeared during 2–4 hours after the administration. Similar results were observed with rabbits, rats and mice.

TABLE I.—HYPOCHOLESTEROLEMIC EFFECTS IN DOGS

| Drug | Dose p.o., mg./kg. | Cholesterol initial, mg./dl. | Cholesterol, mg./dl., effects in percent hours | | | |
|---|---|---|---|---|---|---|
| | | | 1.0 | 2.0 | 4.0 | 6.0 |
| 5-O-nicotinyl-pyridoxine | 10.0 | 107.0 | 103.1 (−4.3) | 83.1 (−22.9) | 104.1 (−3.4) | 101.1 (−6.2) |
| | 33.3 | 81.3 | 52.7 (−36.2) | 31.1 (−61.8) | 65.1 (−20.0) | 72.9 (−10.4) |
| | 100.0 | 94.5 | 86.9 (−8.1) | 81.5 (−13.8) | 70.7 (−25.0) | 81.0 (−14.3) |
| Pyridoxine | 33.3 | 76.1 | 76.1 (0) | 77.7 (+2.1) | 83.3 (+9.4) | 87.6 (+15.6) |
| Nicotinic acid | 33.3 | 79.6 | 80.9 (+1.6) | 78.0 (−2.1) | 83.1 (+4.3) | 83.7 (+5.1) |
| Nicotinic acid plus pyridoxine | 33.3 | 101.2 | 97.8 (−3.4) | 94.4 (−6.8) | 106.1 (+4.8) | 108.0 (+6.7) |
| Control | 0 | 102.5 | 98.0 (−4.4) | 98.9 (−3.6) | 102.3 (−0.2) | 108.8 (+6.1) |

Incorporation of sodium acetate-1-$C^{14}$ into liver cholesterol in vivo

To the rate who were orally administered the drugs shown in Table II below for three successive days were given an intravenous injection of radioactive sodium acetate-1-$C^{14}$, and the incorporation of sodium acetate-1-$C^{14}$ into liver cholesterol and blood cholesterol levels were measured in the rats. As can be seen from the results shown in Table II, in the rats administered with 5-O-nicotinyl-pyridoxine the incorporation of sodium acetate-1-$C^{14}$ into liver cholesterol was very strongly inhibited, and also their blood cholesterol levels were remarkably lowered. In the group administered with nicotinic acid, inhibitive activity of the incorporation at a less intensity was observed, but lowering in blood cholesterol level was nil.

TABLE II.—EFFECTS ON THE LIVER AND PLASMA CHOLESTEROL LEVEL AND SODIUM ACETATE-1-$C^{14}$ INCORPORATION INTO LIVER CHOLESTEROL IN VIVO

| | Daily dose p.o., mM./kg. | No. of rats | Liver cholesterol | | Plasma cholesterol, mg./dl. of plasma |
|---|---|---|---|---|---|
| | | | mg./g. of liver | d.p.m./mg. of cholesterol | |
| Drug: | | | | | |
| Control | 0 | 5 | 6.11±0.49 | 74.6±11.3 | 52.1±5.6 |
| 5-O-nicotinyl-pyridoxine | 0.365 | 5 | 6.32±0.50 | [1] 31.7±5.4 | [2] 38.2±2.1 |
| Pyridoxine | 0.365 | 5 | 5.76±0.43 | 59.5±19.0 | 39.1±4.3 |
| Nicotinic acid | 0.365 | 5 | 5.95±0.49 | [2] 47.2±8.1 | 54.0±2.5 |

[1] Significantly different from control P<0.01.
[2] Significantly different from control P<0.05.

(2) ANTI-ATHEROSCLEROSIS ACTIVITY

Rabbits were fed daily with 100 g. of laboratory chow of low protein content containing 1% chloresterol and 6% coconut oil for 18 weeks and thus caused to be seized with experimental hyper-cholesteremia and atherosclerosis. In the meantime, 30 mg. of 5-O-nicotinyl-pyridoxine was given to them once in every two days by means of subcutaneous injection. The results are shown in Tables III–V. Remarkable inhibition of elevation in blood cholesterol level was observed, and also occurrence of aortic atherosclerosis and severity of aortic atherosclerosis were inhibited.

TABLE III.—EFFECTS ON BLOOD CHOLESTEROL LEVEL

| Drug | Dose, mg. s.c. | No. of rabbits | Total blood cholesterol, mg./dl. | | | |
|---|---|---|---|---|---|---|
| | | | Initial | 10 weeks | 14 weeks | 18 weeks |
| Control | | 9 | 123.3 | 1,270.5±117.5 | 1,244.7±245.0 | 1,853.4±258.3 |
| 5-O-nicotinyl-pyridoxine | 30 | 8 | 119.7 | 647.8±117.5 | 531.1±83.1 | 875.6±167.7 |

TABLE IV.—OCCURRENCE OF AORTIC ATHEROSCLEROSIS

| Drug | Dose, mg. s.c. | No. of rabbits | No. of rabbits with lesions/No. of rabbits used | | |
|---|---|---|---|---|---|
| | | | Arch | Thoracic | Abdomen |
| Control | | 9 | 9/9 | 9/9 | 8/9 |
| 5-O-nicotinyl-pyridoxine | 30 | 8 | 5/8 | 5/8 | 2/8 |

TABLE V.—SEVERITY OF AORTIC ATHEROSCLEROSIS

| Drug | Dose, mg. s.c. | No. of rabbits | Aortic atheroma plaque area in percent | | |
|---|---|---|---|---|---|
| | | | Arch | Thoracic | Abdomen |
| Control | | 9 | 55.3 | 26.2 | 6.1 |
| 5-O-nicotinyl-pyridoxine | 30 | 8 | 24.4 | 8.2 | 1.9 |

(3) HYPOGLYCEMIC ACTIVITY

Hypoglycemic activity in dogs

To normal unanesthetized dogs, 5-nicotinyl-pyridoxine in capsule was orally administered and its hypoglycemic effects on the dogs were examined for six hours after the administration. The peak effective time was found 2 hours. The results are shown in Table VI below, together with the results of administering, as the controls, pyridoxine, nicotinic acid, and pyridoxine plus nicotinic acid. In case of using the control drugs, much inferior, or hardly any, hypoglycemic effects were observed compared with that using 5-O-nicotinyl-pyridoxine. Similar results were observed when the experimental animals were changed to rabbits, rats and mice.

TABLE VI.—HYPOGLYCEMIC ACTIVITY AT PEAK TIME IN THE DOGS

| | Blood glucose change in percent | | |
|---|---|---|---|
| | 10.0 mg./kg. p.o. | 33.3 mg./kg. p.o. | 100 mg./kg. p.o. |
| Drug:[1] | | | |
| 5-O-nicotinyl-pyridoxine | −16.4 | −33.5 | −55.1 |
| Pyridoxine | 0 | 0 | −6.4 |
| Nicotinic acid | 0 | +9.9 | 0 |
| Pyridoxine plus nicotinic acid | 0 | 0 | −9.4 |

[1] Equivalent doses of 5-O-nicotinyl-pyridoxine.

(4) TOXICITY AND SIDE EFFECTS

5-O-nicotinyl-pyridoxine has no appreciable toxicity. When 3000 mg./kg. each of the same was given to male mice (dd-strain) (body-weight 18–20 g.) by means of oral administration, intraperitoneal injection and subcutaneous injection, no acute toxic symptom or fatal effect was observed. After-observation for a week also showed the same result and thus the drug proved to be perfectly safe. Neither any undesirable side effect on central nervous system or endocrinic system was observed.

For sub-chronic toxicological study, 50, 100, and 200 mg./kg./day of 5-O-nicotinyl-pyridoxine was administered to male and female rats (Donryu-strain) as mixing into laboratory chow (CE–II) for 6 weeks continuously, and thereafter the rate of increase in body-weight and feed intake of the animals were observed. The rats also received macro- and micro-scopical examination of lung, liver, heart, kidney, spleen, adrenal, thyroidea, submandibular gland, thymus, pituitary, uterus, ovary, seminal vesicles, prostate, testis, etc. as well as those tissue weight, and blood analysis, i.e. hematocrit hemoglobin, reticulocyte, erythrocyte, leukocyte and leucocyte differential (lymphocyte, neutrophile, acidophile, monocyte and basophile). No side effect of the drug was perceived in the results of these examinations.

(5) OBSERVATIONS ON ACTIVITIES OF EACH OF THE COMPONENTS

5-O-nicotinyl-pyridoxine was orally administered to rats and by means of bioassay vitamin $B_6$ activity in blood was examined. As the result, better blood vitamin $B_6$ level than those produced by pyridoxal and pyridoxine was confirmed. Again concerning the nicotinic acid component, its incorporation into liver NAD and NADP was better than the case of administration of nicotinic acid alone. 5-O-nicotinyl-pyridoxine was found useful for the prevention of deficient symptoms produced by long feeding either vitamin $B_6$ or nicotinic acid deficient diet to mice and rats. Also the acute and sub-chronic toxicity observations revealed no symptom of nicotinic acid or vitamin $B_6$ deficiency diseases. Furthermore, 5-O-nicotinyl-pyridoxine produced substantially equal effect to that of vitamin $B_6$ for the inhibition of convulsion of mouse caused by toxopyrimidine (vitamin $B_6$-antagonist).

The salts of the compounds (I) can be readily prepared by treatment of an organic solvent solution of the compound with an acid. Pharmaceutically acceptable acid salts include, for example, hydrochloride, sulfate, phosphate, acetate and the like.

Hereinafter the invention will be explained with reference to the examples.

EXAMPLE 1

3,4,5-O-trinicotinyl-pyridoxine

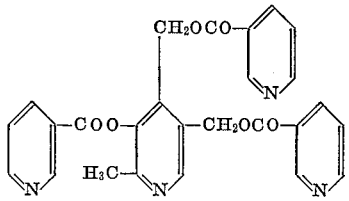

Pyridoxine hydrochloride 2.0 g. and hydrochloride of nicotinic acid chloride 5.3 g. were suspended in 50 ml. of pyridine, and after 3 hours' agitation the pyridine hydrochloride formed was filtered off, and the filtrate was concentrated under a reduced pressure. The residue was dissolved in chloroform, and washed with ice water, 5% aqueous sodium bicarbonate solution and water by the order stated, followed by drying with Glauber's salt and distilling off of chloroform. The residue was dissolved in absolute ethanol, and through which dry hydrogen chloride gas was passed. Then ether was added to the system and the resultant precipitate was separated by filtration, which was again dissolved in a minor amount of ethanol and precipitated by addition thereto of ether. Recovering the precipitate by filtration, 1 g. of trinicotinyl-pyridoxine hydrochloride having a M.P. of 173–175° C. was obtained.

EXAMPLE 2

3,5-O-dinicotinyl-pyridoxal

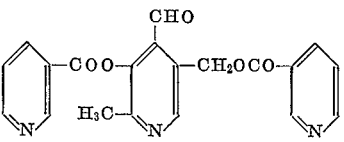

Pyridoxal hydrochloride 1.4 g. and hydrochloride of nicotinic acid chloride 2.5 g. were suspended in 30 ml.

of chloroform, and into the system 30 ml. of pyridine was dropped with agitation. After 3 hours' subsequent agitation at room temperature, the pyridine hydrochloride formed was removed by filtration, and the solvent was distilled off under a reduced pressure. The residue was extracted with chloroform, and the chloroform phase was washed with 0.5 N hydrochloric acid, 5% aqueous sodium bicarbonate solution and water by the order stated, followed by drying with Glauber's salt and distilling off of chloroform. The residue was dissolved in ethanol and added with ether. Recovering the crystal thus precipitated by means of filtration, 0.4 g. of 3,5-O-dinicotinyl-pyridoxal having an M.P. of 118–119° C. was obtained.

Elementary analysis: $C_{20}H_{15}N_3O_5$.—Calculated value (percent): C, 63.66; H, 4.01; N, 11.14. Experimental value (percent): C, 63.37; H, 4.03; N, 10.93.

EXAMPLE 3

3,5-O-4-N-trinicotinyl-pyridoxamine

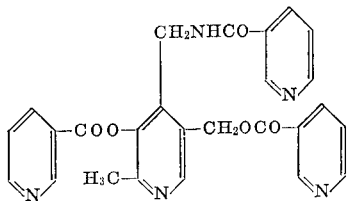

Pyridoxamine hydrochloride 2.4 g. was suspended in 50 ml. of pyridine and to which 5.4 g. of hydrochloride of nicotinic acid chloride was added. After 3 hours' agitation at room temperature, the system was let stand for 2 days. Following the removal of pyridine hydrochloride by filtration, pyridine was completely distilled off, and the residue was extracted with chloroform. The chloroform phase was washed with ice water and dried with Glauber's salt, from which chloroform was distilled off under a reduced pressure. The residue was dissolved in ethanol, and the crystal precipitated by addition of ether thereto was recovered by filtration. Thus 0.4 g. of trinicotinyl-pyridoxamine having an M.P. of 174° C. was obtained.

Elementary analysis: $C_{26}H_{19}N_5O_5$.—Calculated value (percent): C, 64.59; H, 4.38; N, 14.49. Experimental value (percent): C, 64.79; H, 4.54; H, 14.38.

EXAMPLE 4

4,5-O-isopropylidene-3-O-nicotinyl-pyridoxine

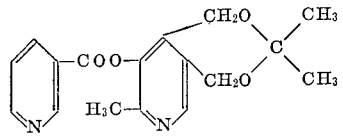

4,5-O-isopropylidene-pyridoxine 2.1 g. was dissolved in 50 ml. of pyridine, and to the solution 2.0 g. of hydrochloride of nicotinic acid chloride was added. After 3 hours' agitation at room temperature, pyridine hydrochloride was removed by filtration, and the system was concentrated at reduced pressure and completely removed of pyridine. The residue was extracted with chloroform, and the chloroform phase was water-washed, dried with Glauber's salt, and removed of chloroform by distillation. Recrystallizing the residue from water-containing ethanol, 1.5 g. of 4,5-O-isopropylidene-3-O-nicotinyl-pyridoxine having an M.P. of 107–108.5° C. was obtained.

Elementary analysis: $C_{17}H_{18}N_2O_4$.—Calculated value (percent): C, 64.95; H, 5.77; N, 8.91. Experimental value (percent): C, 65.04; H, 5.73; N, 8.88.

EXAMPLE 5

3,4-O-isopropylidene-5-O-nicotinyl-pyridoxine

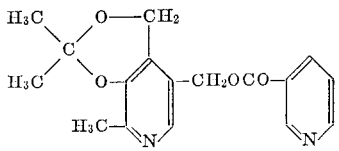

3,4-O-isopropylidene-pyridoxine hydrochloride 2.5 g. was suspended in 50 ml. of pyridine, and to which 2.0 g. of hydrochloride of nicotinic acid chloride was added. After 2 hours of agitation at room temperature, the system was let stand overnight. Following the removal of pyridine hydrochloride by filtration, the system was concentrated under a reduced pressure and removed completely of pyridine. The residue was extracted with chloroform, and the chloroform phase was water-washed, dried with Glauber's salt, and removed of chloroform by distillation. Recrystallizing the residue from water-containing ethanol, 1.4 g. of 3,4-O-isopropylidene-5-O-nicotinyl-pyridoxine having an M.P. of 98–101° C. was obtained.

Elementary analysis: $C_{17}H_{18}N_2O_4$—Calculated value (percent): C, 64.95; H, 5.77; N, 8.91. Experimental value (percent): C, 65.04; H, 5.73; N, 8.88.

EXAMPLE 6

5-O-nicotinyl-pyridoxine

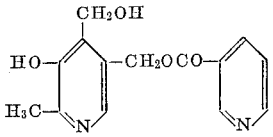

3,4-O-isopropylidene - 5 - O - nicotinyl-pyridoxine 0.5 g. was suspended in 55 ml. of 10% formic acid containing 20 ml./100 ml. of ethanol and refluxed for 30 minutes. The solvent was distilled off under a reduced pressure and the residue was dissolved in ethanol with heating. Upon cooling the solution after filtration, crystal precipitate was separated. Recrystallizing the same from a minor amount of ethanol, 0.15 g. of 5-O-nicotinyl-pyridoxine having an M.P. of 174° C. was obtained.

Elementary analysis: $C_{14}H_{13}N_2O_4$—Calculated value (percent): C, 63.66; H, 4.01; N, 11.14. Experimental value (percent): C, 63.37; H, 4.03; N, 10.93.

EXAMPLE 7

3,4-O-isopropylidene-pyridoxine 2.0 g. and nicotinic acid anhydride 2.63 g. were dissolved in 35 ml. of chloroform, followed by 1.5 hours' agitation at room temperature. The nicotinic acid precipitated (almost quantitatively) was filtered off, and the filtrate was concentrated and dried to produce 3.2 g. of 3,4-O-isopropylidene-5-O-nicotinyl-pyridoxine having an M.P. of 102–104° C.

3,4-O-isopropylidene-5-O-nicotinyl - pyridoxine 3.14 g. was added to 20 ml. of a liquid formed by diluting 4 g. of conc. hydrochloric acid with water, and the system was heated on a hot-water bath (85–90° C.) for 10 minutes with occasional shaking. After cooling, 4 g. of sodium bicarbonate was added to the system to precipitate colorless crystal, which was washed with a minor amount of ethanol to produce 1.95 g. of 5-O-nicotinyl-pyridoxine. Further recrystallizing the same from 50 ml. of ethanol, 1.55 g. of the same product having an M.P. of 174–175° C. (decomposition) was obtained.

EXAMPLE 8

3,4-O-isopropylidene-pyridoxine 1.9 g. was dissolved in 20 ml. of pyridine, and to which 1.2 g. of nicotinic acid was added. After about 10 minutes' agitation when the liquid became transparent, 2.1 g. of dicyclohexylcarbodiimide was added thereto, followed by agitation with exclusion of moisture at room temperature. Immediately after the agitation started, white precipitate began to form. The agitation was continued for an hour, and the system was let stand overnight at room temperature. Then the precipitate was removed by filtration, and pyridine was also distilled off from the system under a reduced pressure. The residue together with 50 ml. of 1 N hydrochloric acid was heated on a boiling water bath for 30 minutes, and let stand overnight at room temperature. The system was thereafter filtered and neutralized with sodium bicarbonate to produce precipitate, which was separated by filtration, water-washed and dried. Thus 0.8 g. of 5-O-nicotinyl-pyridoxine having an M.P. of 174–175° C. was obtained.

EXAMPLE 9

2 - methyl-3-hydroxy-4-hydroxymethyl-5-chloromethyl-pyridine 0.5 g. and potassium nicotinate 0.43 g. were dissolved in 30 ml. of dimethylformamide, and the solution was heated on a hot water bath of 90–96° C. for an hour with agitation. The system was cooled and thereby separated white precipitate of potassium chloride was removed by filtration. The filtrate was distilled off under a reduced pressure. Mixing the residue with ethanol, a colorless precipitate was formed, which, when recrystallized from 20 times thereof of ethanol, produced 215 mg. of 5-O-nicotinyl-pyridoxine having an M.P. of 174° C. (decomposition).

EXAMPLE 10

Pyridoxal hydrochloride 2.0 g. was suspended in 40 ml. of chloroform, and to which 0.8 g. of pyridine and 4.6 g. of nicotinic acid anhydride were added by the order stated, followed by 3 hours' agitation at room temperature. After removal of the nicotinic acid and pyridine hydrochloride thus precipitated by filtration, the solvent was also removed from the system by distillation, and the residue was dissolved in alcohol. The precipitate formed therein by addition thereto of ether was filtered and dried to produce 2.5 g. of the object product having an M.P. of 118–119° C.

We claim:
1. A compound of the formula

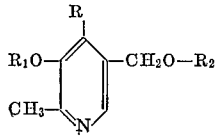

wherein R is —$CH_2OH$, —$CH_2NH_2$, —CHO,

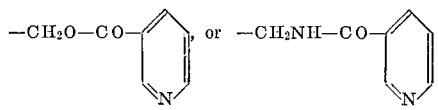

and $R_1$ and $R_2$ each is H or

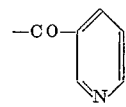

at least one of $R_1$ and $R_2$ being

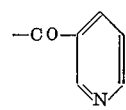

when R is —$CH_2OH$, —$CH_2NH_2$ or —CHO.
2. 3,5-O-dinicotinyl-pyridoxal.
3. 3,5-O-4-N-trinicotinyl-pyridoxamine.
4. 5-O-nicotinyl-pyridoxine.
5. 3,4,5-O-trinicotinyl-pyridoxine.
6. 4,5-O-isopropylidene-3-O-nicotinyl-pyridoxine.
7. 3,4-O-isopropylidene-5-O-nicotinyl-pyridoxine.

References Cited

UNITED STATES PATENTS 2,485,152 10/1949 Hartmann et al. ____ 260—295.5
2,524,838 10/1950 Schlapfer _____ 260—295.5

FOREIGN PATENTS 1940M 7/1963 France _____ 260—295.5

ALAN L. ROTMAN, Primary Examiner

U.S. Cl. X.R.
260—296, 297, 297.5, 999